(12) United States Patent
Loeffelmann et al.

(10) Patent No.: US 12,140,189 B2
(45) Date of Patent: Nov. 12, 2024

(54) SHIFTING DEVICE

(71) Applicant: Schaeffler Technologies AG & Co. KG, Herzogenaurach (DE)

(72) Inventors: Jochen Loeffelmann, Eggolsheim (DE); Viktor Ruder, Fürth (DE); Felix Reuss, Nuremberg (DE); Thomas Huemmer, Adelsdorf (DE); Alexander Wagner, Erlangen (DE); Alexander Wirth, Forchheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/922,397

(22) PCT Filed: Apr. 26, 2021

(86) PCT No.: PCT/DE2021/100374
§ 371 (c)(1),
(2) Date: Oct. 31, 2022

(87) PCT Pub. No.: WO2021/228317
PCT Pub. Date: Nov. 18, 2021

(65) Prior Publication Data
US 2023/0265896 A1    Aug. 24, 2023

(30) Foreign Application Priority Data

May 15, 2020  (DE) .......................... 102020113251.4
Jun. 16, 2020  (DE) .......................... 102020115862.9

(51) Int. Cl.
*F16D 11/14* (2006.01)
*F16D 23/14* (2006.01)
*F16D 28/00* (2006.01)

(52) U.S. Cl.
CPC .............. *F16D 11/14* (2013.01); *F16D 23/14* (2013.01); *F16D 28/00* (2013.01)

(58) Field of Classification Search
CPC .... F16D 11/08–10; F16D 11/14; F16D 23/12; F16D 23/14; F16D 3/10–12;
(Continued)

(56) References Cited

U.S. PATENT DOCUMENTS 3,681,939 A * 8/1972 Timtner .................... F16D 3/66
                                                                464/84
5,389,040 A * 2/1995 Kakimi ..................... F16D 3/52
                                                                464/57
(Continued)

FOREIGN PATENT DOCUMENTS

DE    102014217066    3/2015
DE    102016224864    6/2017
(Continued)

*Primary Examiner* — Ernesto A Suarez
*Assistant Examiner* — James J Taylor, II
(74) *Attorney, Agent, or Firm* — Volpe Koenig

(57) ABSTRACT

A shifting device (1) for the powertrain of a motor vehicle, including a control shaft (10) for adjusting a control element (9), the control shaft (10) has a first sub-section (15) which can be driven by an actuator (36) and a second sub-section (16) which is designed to adjust the control element (9). The first sub-section (15) is rotatably mounted relative to the second sub-section (16). A spring element (11), via which a torque of the first sub-section (15) can be transmitted to the second sub-section (16), is provided between the two sub-sections (15, 16).

19 Claims, 2 Drawing Sheets

(58) Field of Classification Search
CPC .......... F16D 3/52; F16D 3/64–66; F16D 3/72; H02K 1/28–30; H02K 7/003; H02K 7/081

See application file for complete search history.

(56) References Cited

U.S. PATENT DOCUMENTS

| | | | |
|---|---|---|---|
| 8,997,957 B2 * | 4/2015 | Eder | F16D 11/14 |
| | | | 192/69.82 |
| 10,323,693 B2 * | 6/2019 | Beesley | F16D 28/00 |
| 10,843,558 B2 * | 11/2020 | Burrell | B60K 17/28 |
| 11,472,044 B2 * | 10/2022 | Awad | B25J 17/0208 |
| 2007/0199792 A1 | 8/2007 | Ashauer | |
| 2015/0343901 A1 * | 12/2015 | Brooks | F16D 11/14 |
| | | | 180/245 |
| 2022/0111715 A1 * | 4/2022 | Holzapfel | B60K 17/356 |

FOREIGN PATENT DOCUMENTS

| | | |
|---|---|---|
| DE | 102018213163 | 2/2020 |
| WO | 2011098595 | 8/2011 |

* cited by examiner

SHIFTING DEVICE

CROSS-REFERENCE TO RELATED APPLICATIONS

This application is the U.S. National Phase of PCT Appln. No. PCT/DE2021/100374, filed Apr. 26, 2021, which claims the benefit of German Patent Appln. No. 10 2020 113 251.4, filed May 15, 2020, and German Patent Appln. No. 10 2020 115862.9, filed Jun. 16, 2020, the entire disclosures of which are incorporated by reference herein.

TECHNICAL FIELD

The disclosure relates to a shifting device for a powertrain of a motor vehicle.

BACKGROUND

From DE 10 2014 217 066 A1, a clutch for a shiftable all-wheel drive is known, in which two aligned drive shafts are connected to one another by a clutch part which enables a form-fitting connection between the two drive shafts. The clutch has a shifting element in the form of a shifting fork, with which a clutch part that is displaceable in the axial direction is displaced in such a way that the positive connection between the two drive shafts is established.

A coupling assembly for a powertrain of a motor vehicle is known from WO 2011/098 595 A1, which comprises at least one clutch that is arranged on a rotating shaft in order to selectively couple the rotating shaft to a drive element of the powertrain. The coupling assembly further comprises at least one actuating device for actuating the clutch. The actuating device is designed to selectively bring an engagement section into engagement with a threaded section rotating with the shaft in order to bring about a relative movement of the engagement section and the threaded section in the direction of the axis of the rotating shaft and thereby to actuate the clutch in the axial direction.

SUMMARY

It is the object of the present application to provide an improved shifting device for a powertrain of a motor vehicle.

The object is achieved by one or more of the features disclosed herein. Further preferred embodiments can be found in the claims, the figures and the associated description.

To achieve this object, a shifting device for a powertrain of a motor vehicle is provided, comprising a housing in which a first and a second drive shaft are rotatably mounted, wherein the first and second drive shaft are arranged coaxially to one another so that they have a common axis of rotation, and a shiftable clutch device which is arranged between the first and the second drive shaft, wherein the clutch device has an open shift position, in which the first drive shaft is freely rotatable relative to the second drive shaft, and the clutch device has a closed shift position in which the first drive shaft is connected to the second drive shaft via the clutch device in a rotationally fixed manner, wherein the clutch device has a non-displaceable clutch element not displaceable in the direction of the axis of rotation and a displaceable clutch element displaceable in the direction of the axis of rotation by means of a control element, wherein a control shaft is provided for adjusting a control element, wherein the control shaft has a first sub-section which can be driven by an actuator and a second sub-section which is designed to adjust the control element, wherein the first sub-section is rotatably mounted relative to the second sub-section, wherein a spring element, via which a torque of the first sub-section can be transmitted to the second sub-section, is provided between the two sub-sections.

The force acting between the two clutch elements can be set in a simplified manner by the spring element, without the need for a complex sensor system. Furthermore, any play that may be present due to component tolerances between various components of the shifting device, for example between the control shaft and the control element, or also play in the actuator driving the control shaft can be compensated. Due to the integration of the spring element according to this application in the control shaft, further spring and/or damping bearing means for components of the clutch device can be dispensed with, as a result of which a simplified structure is made possible.

The spring element within the meaning of this application does not necessarily have to be in direct contact with the first and/or second sub-section of the control shaft; further components; for example, a receptacle or a holder for the spring element, can be interposed between these components and the spring element.

In a preferred embodiment, the clutch device is formed by a claw clutch. The spring element can interact with a claw clutch in a particularly advantageous manner. In this type of clutch, the clutch elements are formed by claw clutch elements. In order to shift the claw clutch from the open shift position to the closed shift position, the claws of one clutch element must engage in an intermediate space which is formed by the claws of the other respective clutch element. Due to the spring element, a cushioning effect is achieved during the shifting process, which has an advantageous effect on the service life and durability of the shifting device.

According to a further embodiment, the first sub-section is mounted in relation to the second sub-section in such a way that when the first sub-section rotates in a first direction, the torque is transmitted to the second sub-section by a force flow via the spring element. When moving the displaceable clutch element in the direction of the axis of rotation of the drive shafts to the non-displaceable clutch element, it may be that the claws are not synchronized, i.e., a form-fitting engagement is not yet possible. Since the actuator driving the control shaft and the spring element are connected in series with regard to the transmission of the control force, a deflection function can advantageously be implemented in a not yet synchronized state or when the relative speed of the two clutch elements is too high. In such a state, the energy acting through the control shaft on the displaceable clutch element can be absorbed by the spring element until a suitable state for coupling the non-displaceable clutch element to the displaceable clutch element is reached. As soon as the two clutch elements are synchronized, the energy stored in the spring element is released again and the displaceable clutch element is brought completely into the closed shift position. A control or regulation of an actuator driving the control shaft can thus be dispensed with, which would require an additional sensor device, for example. In this configuration, the spring element thus enables a structurally simple structure with which reliable shifting into the closed shift position is made possible. Impacts or vibrations that act on the displaceable clutch element during the coupling process can also be absorbed by the spring element and do not affect other elements, such as an actuator, so that the operational stability is also increased as a result.

Preferably, the first sub-section is mounted in relation to the second sub-section in such a way that when the first sub-section rotates in a second direction, the torque is transmitted to the second sub-section without a force flow via the spring element. The first direction of rotation is opposite the second direction of rotation. In order to transmit the torque during rotation in the second direction of rotation without a force flow via the spring element, the first and second sub-sections preferably each have a force transmission surface via which a torque can be transmitted directly from the first sub-section to the second sub-section. It has proven to be advantageous to apply the control forces of the drive to the displaceable clutch element when shifting into the open shift position without the interposition of spring and/or damping elements, since this enables instantaneous decoupling.

According to a preferred embodiment, a rotation of the first sub-section in the first direction causes the clutch device to be shifted into the closed shift position, and a rotation of the first sub-section in the opposite second direction causes the clutch device to be shifted into the open shift position. Through this assignment of the directions of rotation, the advantageous effect of the spring element can be used when shifting to the closed shift position and instantaneous shifting can be achieved without the involvement of the spring element when shifting to the open shift position.

The spring element is preferably a torsion spring. The torsion spring is an inexpensive spring element which can be connected to the first and second sub-sections of the control shaft in a rotationally fixed manner using simple structural means.

According to a further embodiment, one end of the first or the second sub-section is rotatably mounted with one end in the respective other sub-section, wherein the spring element is mounted radially in relation to the axis of rotation of the control shaft between the first and the second sub-section. The second sub-section is preferably mounted in the first sub-section. The spring element can, for example, be mounted between the first and the second sub-section over its entire axial extension in relation to the axis of rotation of the control shaft. This results in a particularly compact construction. Further advantages are, for example, improved ease of handling during assembly and also improved operational stability, because the spring element is protected from environmental influences by the first and second sub-sections.

According to a further embodiment, the maximum relative rotational movement of the first sub-section in relation to the second sub-section is defined by a contour of the second sub-section into which a radial extension of the first sub-section protrudes. In this way, the sub-sections can be prevented from spinning relative to one another. Furthermore, the contour and the radial extension can each have a force transmission surface via which the torque can be transmitted in a second direction when the first sub-section rotates without involving the spring element.

Preferably, the control shaft is a pinion shaft. Accordingly, the pinion shaft has an external toothing at least in one area in order to interact with a transmission element of the control element. In this way, the control forces can be transmitted from the control shaft to the control element in a structurally simple manner. The control element can be formed, for example, by a sliding sleeve which encloses at least one of the two drive shafts, wherein the gear element is provided on an outer circumference of the sliding sleeve. The sliding sleeve offers the advantage that a particularly simple and cost-effective control element can be implemented, which allows particularly high positioning accuracy due to its stability. The gear element arranged on the outer circumference of the sliding sleeve can be provided, for example, only in a sub-section of the sliding sleeve or alternatively also over the entire circumference of the sliding sleeve.

According to a further exemplary embodiment, an end stop is provided for the displaceable clutch element which, in the direction of the axis of rotation of the drive shafts, determines the end position of the displaceable clutch element in the open shift position. The end stop is preferably a material with elastic properties; for example, a rubber buffer, so that energy is absorbed when the displaceable clutch element hits the end stop. The end stop eliminates the need for sensor elements or more complex control electronics.

BRIEF DESCRIPTION OF THE DRAWINGS

In the following, the disclosure is explained by means of preferred embodiments with reference to the attached figures. In the figures.

DETAILED DESCRIPTION

Figure 1:
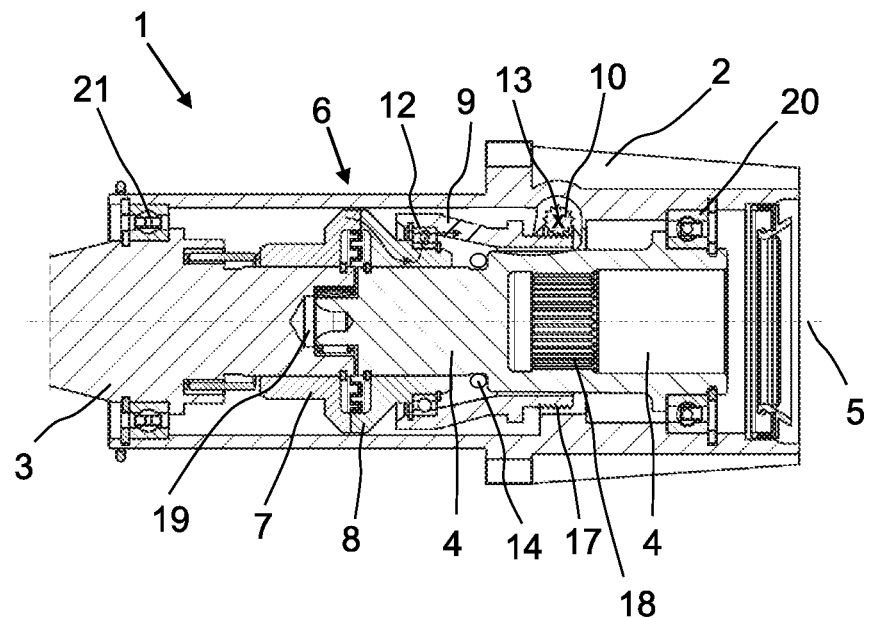
FIG. 1 shows a sectional view of a shifting device.

FIG. 1 shows a shifting device 1 with a first drive shaft 3 and a second drive shaft 4 which can be connected to one another in a rotationally fixed manner via a clutch device 6.

The second drive shaft 4 comprises two sub-shafts which are non-rotatably connected to one another via a toothing 18. The second drive shaft 4 is mounted at one end in a receptacle 19 of the first drive shaft 3 and via a ball bearing 20 in relation to a housing 2. The first drive shaft 3 is supported within the housing 2 by a ball bearing 21 and by an extension of the second drive shaft 4 which projects into the receptacle 19 of the first drive shaft 3. The first and second drive shafts 3 and 4 are aligned coaxially with one another and therefore rotate about a common axis of rotation 5.

One end of each of the first and second drive shafts 3 and 4 protrudes from the housing 2. In the mounted state, the first drive shaft 3 can then be connected in a rotationally fixed manner to a differential gear, for example, and the second drive shaft 4 to a drive wheel, for example, or vice versa. At the ends of the first and second drive shafts 3 and 4 facing one another, the clutch device 6 is provided, which comprises a first non-displaceable clutch element 7 assigned to the first drive shaft 3 and a displaceable clutch element 8 assigned to the second drive shaft 4. The clutch device 6 can be shifted into an open shift position in which the first drive shaft 3 and the second drive shaft 4 are not connected to one another in a rotationally fixed manner. Furthermore, the clutch device 6 can be shifted into a closed shift position in which the first drive shaft 3 is connected to the second drive shaft 4 in a rotationally fixed manner. The clutch device 6 is controlled by means of a control element 9 which is mounted on the second drive shaft 4 in an axially displaceable manner, i.e., in the direction of the axis of rotation 5. The control element 9 is designed, for example, as a sliding sleeve, wherein the sleeve extends from a gear element 17 to the point at which the control forces are introduced into the displaceable clutch element 8 via a roller bearing 12. The gear element 17 is preferably formed by an external toothing.

When the clutch device 6 is shifted from the open to the closed shift position, a control shaft 10, which is formed by a pinion shaft, is driven by an actuator 36 (see FIG. 2), so that it rotates about an axis of rotation 13. The control shaft 10 then transmits the control forces via the control element 9 and the roller bearing 12 to the displaceable clutch element 8.

When the control shaft 10 rotates in a first direction 31 (see FIG. 2), the control element 9 and thus also the displaceable clutch element 8 in FIG. 1 are moved in the direction of the non-displaceable clutch element 7, so that the clutch device 6 is shifted into the closed shift position.

If the control shaft 10 is rotated in a second direction 32 (see FIG. 2), then the control element 9 and the displaceable clutch element 8 move in the opposite direction, so that the clutch device 6 is shifted into the open shift position. In the open shift position, the displaceable clutch element 8 then rests against an end stop 14, which is preferably formed by a rubber buffer.

Figure 2:
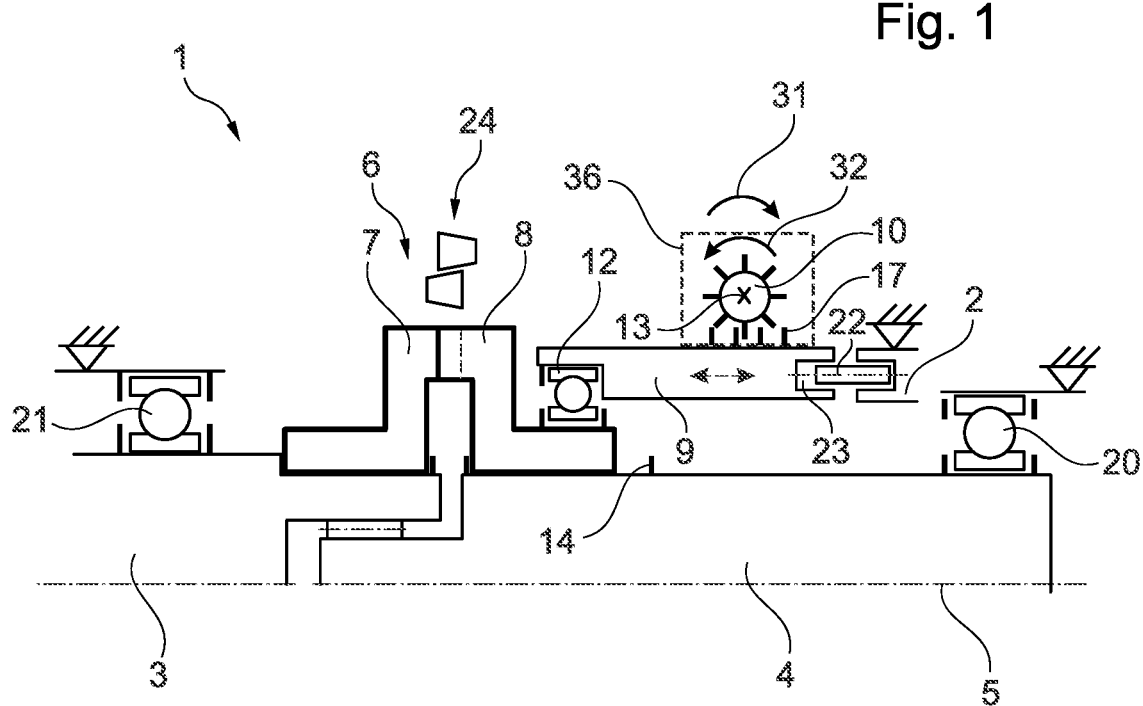
FIG. 2 shows a schematic representation of a shifting device.

FIG. 2 shows a schematic representation of the shifting device 1 according to the first embodiment already known from FIG. 1. Therefore, in the following, only the additionally presented features will be discussed. FIG. 2 shows the closed shift position in which the claws 24 (shown schematically) of the clutch elements 7 and 8 are engaged. A bearing element 22, which is aligned parallel to the axis of rotation 5, is provided for the displaceable mounting of the control element 9. The bearing element 22 is preferably formed by a pin which is immovably mounted in the housing 2. The control element 9 has a receptacle 23 for the bearing element 22, so that a displaceable movement of the control element 9 in the direction of the axis of rotation 5 is enabled. The receptacle 23 is preferably designed in such a way that the control element 9 is secured in the tangential direction, i.e., it cannot rotate. This is advantageous because, despite the roller bearing 12, a torque about the axis of rotation 5 can act on the control element 9 when the displaceable clutch element 8 rotates.

FIG. 2 shows the control shaft 10 comprising a first sub-section 15, a second sub-section 16 and a spring element 11, wherein a torque is transmitted from the first sub-section 15 to the second sub-section 16 via the spring element 11.

Figure 3:
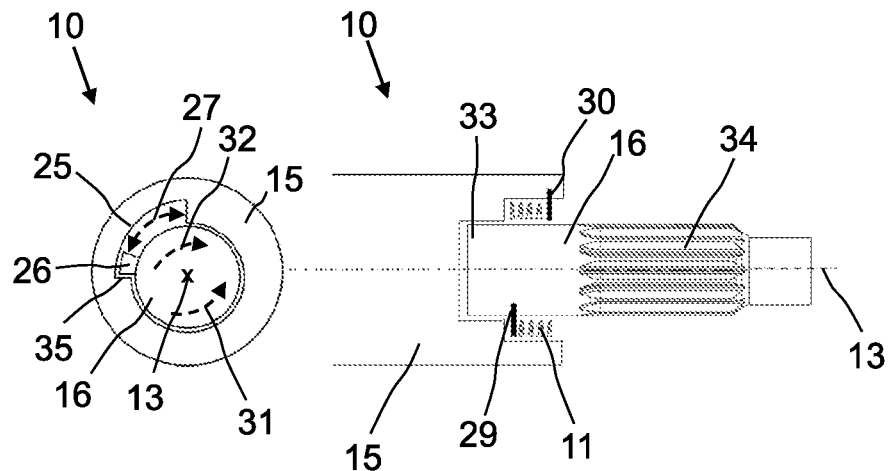
FIG. 3 shows a schematic representation of a control shaft from two perspectives.

As shown in FIG. 3, the spring element 11 is arranged radially in relation to the axis of rotation 13 of the control shaft 10 between the first sub-section 15 and the second sub-section 16. Furthermore, the spring element 11 is also completely surrounded axially in relation to the axis of rotation 13 by the first sub-section 15 and in the second sub-section 16, so that the spring element 11 is integrated in the control shaft 10.

Figure 4:
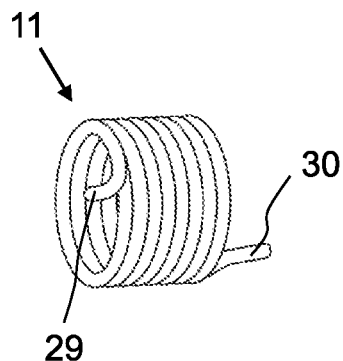
FIG. 4 shows a perspective representation of a spring element.

FIG. 4 shows a perspective view of the spring element 11, which is formed by a torsion spring. The spring element 11 has a first spring end 29 which is connected to the second sub-section 16 in a rotationally fixed manner and a second spring end 30 which is connected to the first sub-section 15 in a rotationally fixed manner.

In the representation on the left in FIG. 3, the control shaft 10 is shown in a frontal view, wherein the first sub-section 15 has a contour 25 which is open radially inward in relation to the axis of rotation 13. A radial extension 26 of the second sub-section 16 engages in the contour 25, so that the torsional movement of the sub-sections 15 and 16 relative to one another is limited.

When the first sub-section 15 rotates in the first direction 31, a torque acts on the second sub-section 16 via the spring element 11, so that the latter is also rotated in the first direction 31. The maximum spring deflection 27 of the spring element 11 is determined by the dimensioning of the contour 25 and the extension 26 to one another. The first sub-section 15 can preferably be rotated by 10° to 180° relative to the second sub-section 16, more preferably by 45° to 135°, particularly preferably by 70° to 110°.

Figure 5:
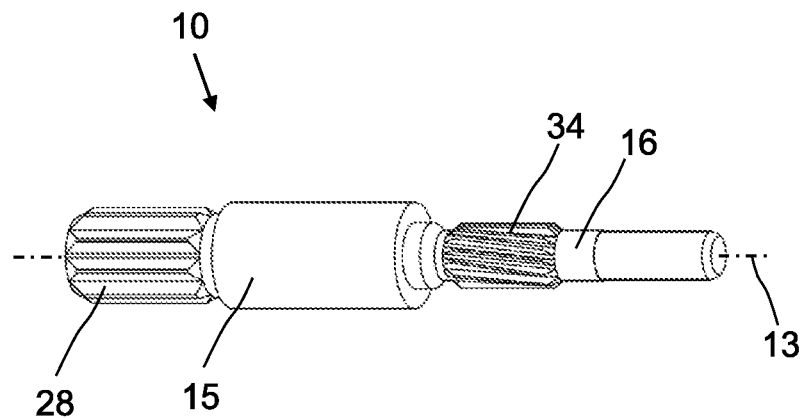
FIG. 5 shows a perspective representation of a control shaft.

When the clutch device 6 is shifted from the open to the closed shift position, the first sub-section 15 is driven in a first direction 31 by the actuator 36, which is not a component of the shifting device 1. The actuator 36 transmits the torque to the control shaft 10 via a connecting means 28 (see FIG. 5) of the first sub-section 15. The torque of the first sub-section 15 is transmitted to the second sub-section 16 via the spring element 11, so that a torque is transmitted to the transmission element 17 of the control element 9 via an external toothing 34 of the second sub-section 16. The control element 9 then moves the displaceable clutch element 8 in the direction of the non-displaceable clutch element 7, so that the closed shift position is reached.

This shifting process into the closed shift position takes place by means of the spring effect of the spring element 11. The clutch device 6 is a claw clutch, such that the closed shift position of the clutch device 6 is only reached when the claws 24 of the respective clutch elements 7 and 8 are fully engaged with one another. The spring force of the spring element 11 presses the displaceable clutch element 8 against the non-displaceable clutch element 7 with a predefined force. If the claws 24, which are also shown schematically in FIG. 2, of the two clutch elements 7 and 8 are not synchronized, it is not yet possible to engage in the closed shift position. Due to the spring element 11, the control shaft 10 can still continue to exert the actuating force or actuating movement on the control element 9 because the spring element 11 can compensate for this movement. As soon as the claws 24 of the two clutch devices 7 and 8 are synchronized by a relative movement of the first drive shaft 3 relative to the second drive shaft 4, the spring element 11 can release the stored control energy via the second sub-section 16, the control element 9 and the roller bearing 12 to the displaceable clutch element 8, so that the latter is brought completely into the closed shift position. The actuator 36 driving the control shaft 10 therefore does not have to be controlled in a complex manner or regulated with the aid of sensors.

When the clutch device 6 is shifted from the closed to the open shift position, the first sub-section 15 of the control shaft 10 is rotated in a second direction 32 via the actuator 36. The contour 25 of the first sub-section 15 moves relative to the extension 26 until the extension 26 comes to rest on a force transmission surface 35 of the contour 25. The torque of the first sub-section 15 can thus be transmitted to the second sub-section 16 via the directly adjacent extension on a force transmission surface 35 of the contour 25. The torque of the first sub-section 15 is thus transmitted to the second sub-section 16 without a spring effect. The actuating forces can then be transmitted to the gear element 17 of the control element 9 via the external toothing 34 of the second sub-section 16 (see FIGS. 1 and 2). The control element 9 is then moved away from the non-displaceable clutch element 7 together with the displaceable clutch element 8, so that the clutch device 6 is shifted into the open shift position. By avoiding a force flow via the spring element 11 during the shifting process into the open shift position, efficient and instantaneous decoupling can be achieved. In the open shift position, the displaceable force transmission element 8 is then in contact with the end stop 14.

LIST OF REFERENCE NUMERALS

1 Shifting device
2 Housing
3 First drive shaft
4 Second drive shaft
5 Axis of rotation (of the drive shaft)
6 Clutch device
7 Non-displaceable clutch element
8 Displaceable clutch element
9 Control element
10 Control shaft
11 Spring element
12 Rolling bearing
13 Axis of rotation (of the control shaft)
14 End stop
15 First sub-section (of the control shaft)
16 Second sub-section (of the control shaft)
17 Gear element
18 Toothing
19 Receptacle
20 Ball bearing
21 Ball bearing
22 Bearing element
23 Receptacle (for bearing element)
24 Claws
25 Contour
26 Extension
27 Spring deflection
28 Connecting means
29 First spring end
30 Second spring end
31 First direction (of the rotation of the control shaft)
32 Second direction (of the rotation of the control shaft)
33 End (of the second sub-section)
34 External toothing
35 Force transmission surface
36 Actuator

The invention claimed is:

1. A shifting device for a powertrain of a motor vehicle, the shifting device comprising:
a housing in which a first drive shaft and a second drive shaft are rotatably mounted, the first drive shaft and the second drive shaft are arranged coaxially to one another and have a common axis of rotation;
a shiftable clutch is arranged between the first drive shaft and the second drive shaft; wherein the clutch has an open shift position, in which the first drive shaft is freely rotatable relative to the second drive shaft, and has a closed shift position in which the first drive shaft is connected to the second drive shaft via the clutch in a rotationally fixed manner;
the clutch includes a non-displaceable clutch element that is not displaceable in a direction of the common axis of rotation and a displaceable clutch element that is displaceable in the direction of the common axis of rotation by a control element;
a control shaft oriented orthogonal to the common axis of rotation, the control shaft is configured to adjust the control element, and the control shaft has a first sub-section which is drivable by an actuator and a second sub-section which is configured to adjust the control element;
the first sub-section is rotatably mounted relative to the second sub-section;
a spring element, via which a torque of the first sub-section is transmittable to the second sub-section, located between the two sub-sections; and
an end stop for the displaceable clutch element which, in the direction of the common axis of rotation of the first drive shaft and the second drive shaft, determines an end position of the displaceable clutch element in the open shift position, the end stop being positioned directly adjacent a radially outer surface of the second drive shaft.

2. The shifting device according to claim 1, wherein the clutch is a claw clutch.

3. The shifting device according to claim 1, wherein the first sub-section is mounted relative to the second sub-section such that, when the first sub-section rotates in a first direction, the torque is transmitted to the second sub-section by a force flow via the spring element.

4. The shifting device according to claim 3, wherein the first sub-section is mounted relative to the second sub-section such that, when the first sub-section rotates in a second direction, the torque is transmitted to the second sub-section without the force flow via the spring element.

5. The shifting device according to claim 4, wherein a rotation of the first sub-section in the first direction causes the clutch to be shifted into the closed shift position, and a rotation of the first sub-section in the opposite second direction causes the clutch to be shifted into the open shift position.

6. The shifting device according to claim 1, wherein the spring element is a torsion spring.

7. The shifting device according to claim 1, wherein the first or the second sub-section is rotatably mounted with one end in the respective other sub-section, and the spring element is mounted radially in relation to an axis of rotation of the control shaft between the first sub-section and the second sub-section.

8. The shifting device according to claim 1, wherein a maximum relative rotational movement of the first sub-section relative to the second sub-section is defined by a contour of the first sub-section, into which a radial extension of the second sub-section protrudes.

9. The shifting device according to claim 1, wherein the control shaft is a pinion shaft.

10. The shifting device according to claim 1, wherein the end stop is configured to contact an axial end face of the displaceable clutch element to determine the end position of the displaceable clutch element in the open shift position.

11. A shifting device for a powertrain of a motor vehicle, the shifting device comprising:
a housing in which a first drive shaft and a second drive shaft are rotatably mounted, the first drive shaft and the second drive shaft are arranged coaxially to one another and have a common axis of rotation;
a shiftable clutch arranged between the first drive shaft and the second drive shaft;
the shiftable clutch has an open shift position, in which the first drive shaft is freely rotatable relative to the second drive shaft, and has a closed shift position in which the first drive shaft is connected to the second drive shaft via the clutch in a rotationally fixed manner;
the clutch includes an axially fixed clutch element and an axially displaceable clutch element that is displaceable by a control element;
a control shaft oriented orthogonal to the common axis of rotation, the control shaft is configured to adjust the control element, and the control shaft has a first sub-section which is rotatable by an actuator and a second sub-section which is configured to displace the control element such that the axially displaceable clutch element is displaced;

the first sub-section is rotatably mounted relative to the second sub-section, wherein a maximum relative rotational movement of the first sub-section relative to the second sub-section is defined by a contour of the first sub-section that opens radially inward in relation to an axis of rotation of the control shaft, into which a radial extension of the second sub-section protrudes radially outward from an outer surface of the second sub-section in a direction transverse to the axis of rotation of the control shaft, the radial extension directly contacts a force transmission surface of the contour at the maximum relative rotational movement of the first sub-section relative to the second sub-section; and a torsion spring located between the first sub-section and the second sub-section through which a torque on the first sub-section is transmittable to the second sub-section.

12. The shifting device according to claim 11, wherein the clutch is a claw clutch.

13. The shifting device according to claim 11, wherein the first sub-section is rotatably mounted relative to the second sub-section such that, when the first sub-section rotates in a first direction, the torque is transmitted to the second sub-section via the torsion spring.

14. The shifting device according to claim 13, wherein the first sub-section is mounted relative to the second sub-section such that, when the first sub-section rotates in a second direction, the torque is transmitted to the second sub-section without a force flow via the torsion spring.

15. The shifting device according to claim 14, wherein a rotation of the first sub-section in the first direction causes the clutch to be shifted into the closed shift position, and a rotation of the first sub-section in the opposite second direction causes the clutch to be shifted into the open shift position.

16. The shifting device according to claim 11, wherein the first or the second sub-section is rotatably mounted with one end in the respective other sub-section, and the torsion spring is mounted radially in relation to the axis of rotation of the control shaft between the first sub-section and the second sub-section.

17. The shifting device according to claim 11, wherein the control shaft is a pinion shaft.

18. The shifting device according to claim 11, further comprising an end stop for the displaceable clutch element which, in a direction of the common axis of rotation of the drive shafts, determines an end position of the displaceable clutch element in the open shift position.

19. The shifting device according to claim 18, wherein the first sub-section is rotatable by 10° to 180° relative to the second sub-section.

\* \* \* \* \*